United States Patent
De Laet et al.

(10) Patent No.: US 11,635,104 B2
(45) Date of Patent: Apr. 25, 2023

(54) FASTENER FOR HEAVY TRANSMISSION PARTS

(71) Applicants: ZF FRIEDRICHSHAFEN AG, Friedrichshafen (DE); ZF WIND POWER ANTWERPEN N.V., Lommel (BE)

(72) Inventors: Wim De Laet, Antwerp (BE); Jan Aerts, Friedrichshafen (DE); Dominiek Ceyssens, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 17/642,958

(22) PCT Filed: Aug. 18, 2020

(86) PCT No.: PCT/EP2020/073037
§ 371 (c)(1),
(2) Date: Mar. 15, 2022

(87) PCT Pub. No.: WO2021/052698
PCT Pub. Date: Mar. 25, 2021

(65) Prior Publication Data
US 2022/0333631 A1 Oct. 20, 2022

(30) Foreign Application Priority Data
Sep. 17, 2019 (DE) .................... 10 2019 214 094.7

(51) Int. Cl.
*F16B 19/02* (2006.01)

(52) U.S. Cl.
CPC .................... *F16B 19/02* (2013.01)

(58) Field of Classification Search
CPC ......... B25B 11/00; B25B 27/023; B23Q 3/00; F16B 19/02; F16B 2/00; F16B 2/02;
(Continued)

(56) References Cited

U.S. PATENT DOCUMENTS

| 4,602,890 A * | 7/1986 | Duda .................... F16B 7/105 403/328 |
| 5,778,734 A | 7/1998 | Uchida |

(Continued)

FOREIGN PATENT DOCUMENTS

| CN | 1133950 A | 10/1996 |
| CN | 201301859 Y | 9/2009 |

(Continued)

OTHER PUBLICATIONS

EP3499055—Machine Translation (Year: 2019).*

*Primary Examiner* — Lee D Wilson
*Assistant Examiner* — Alberto Saenz
(74) *Attorney, Agent, or Firm* — Leydig, Voit & Mayer, Ltd.

(57) ABSTRACT

A fastener for a transmission part includes a main body. The main body has at least one external screw thread and at least one through-hole. The fastener further includes a first pin displaceable in a first region of the through-hole and a second pin having an external screw thread. A second region of the through-hole has at least one internal screw thread configured to be screwed to the external screw thread of the second pin. The second pin has a through-hole. The first pin has an internal screw thread aligned with the through-hole of the second pin.

4 Claims, 2 Drawing Sheets

(58) Field of Classification Search
CPC .... F16B 2/065; F16B 2/12; F16B 5/02; F03D 80/50; Y10T 403/7041; Y10T 403/7067; Y10T 403/7069
USPC ...... 29/525.11; 269/47, 48.2, 53, 54.3, 54.4, 269/67, 211, 291
See application file for complete search history.

(56) References Cited

U.S. PATENT DOCUMENTS

2010/0202884 A1\* 8/2010 Wedekind ............. F03D 7/0268
416/153
2013/0178326 A1 7/2013 Franke et al.

FOREIGN PATENT DOCUMENTS

| | | |
|---|---|---|
| DE | 3433738 A1 | 3/1986 |
| DE | 202005013328 U1 | 2/2006 |
| DE | 102009008607 A1 | 8/2010 |
| DE | 102014201465 A1 | 7/2015 |
| EP | 3499055 A1 \* | 6/2019 ............. F16B 19/02 |
| EP | 3499055 A1 | 6/2019 |
| WO | WO 2015187913 A1 | 12/2015 |

\* cited by examiner

FASTENER FOR HEAVY TRANSMISSION PARTS

CROSS REFERENCE TO RELATED APPLICATIONS

This application is a U.S. National Phase application under 35 U.S.C. § 371 of International Application No. PCT/EP2020/073037, filed on Aug. 18, 2020, and claims benefit to German Patent Application No. DE 10 2019 214 094.7, filed on Sep. 17, 2019. The International Application was published in German on Mar. 25, 2021 as WO 2021/052698 A1 under PCT Article 21(2).

FIELD

The disclosure relates to a fastener, to a method for fastening a transmission part, and to a method for releasing the transmission part.

BACKGROUND

In order to assemble and disassemble large transmissions, for example wind power transmissions, it may be necessary to temporarily fasten individual components. There are special fastening means for this purpose. These are screwed in through the transmission housing and hold the component to be fastened. Due to the high masses, there is the risk of the fastening means deforming. If the deformation is too strong, the fastening means jam and can no longer be removed.

SUMMARY

In an embodiment, the present disclosure provides a fastener for a transmission part. The fastener includes a main body. The main body has at least one external screw thread and at least one through-hole. The fastener further includes a first pin displaceable in a first region of the through-hole and a second pin having an external screw thread. A second region of the through-hole has at least one internal screw thread configured to be screwed to the external screw thread of the second pin. The second pin has a through-hole. The first pin has an internal screw thread aligned with the through-hole of the second pin.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
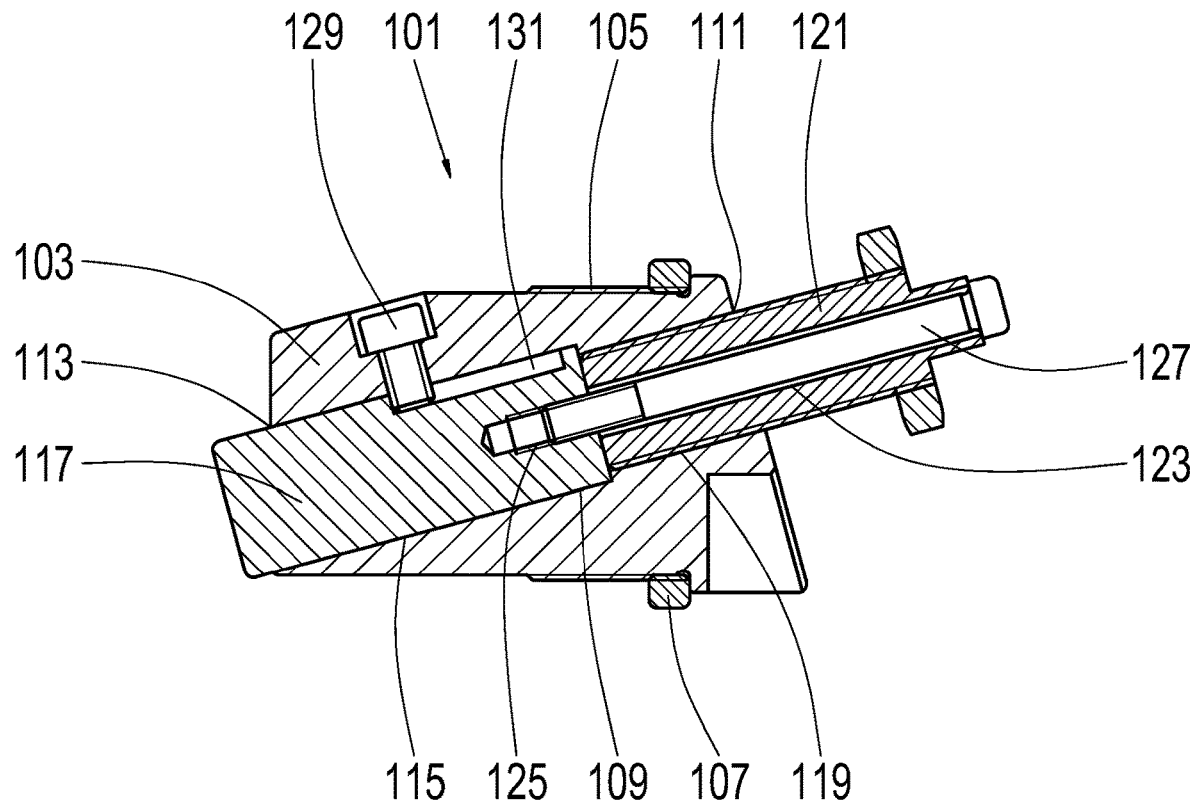
FIG. 1 shows a first variant of a fastener.

The disclosure is directed to fastening transmission parts for assembly or disassembly while avoiding disadvantages inherent in solutions known from the prior art. In particular, the fastener should also be able to be removed in the event of plastic deformation.

A preferably one-piece piece of the fastener—referred to as the main body—has at least one external screw thread and at least one through-hole. The external screw thread serves to screw into a threaded hole of a structure fixed to the housing, for example into the transmission housing itself.

A through-hole is a hole with exactly two openings. In particular, it can be a bore. A bore is a through-hole with a continuous circular cross-section.

According to the disclosure, the fastener has a first pin and a second pin. The first pin can be inserted into a first region of the first through-hole. If the first pin is located in the first region of the through-hole, it is displaceable there. The displacement takes place along a longitudinal axis of the through-hole. If the through-hole is a bore, the longitudinal axis is identical to a central axis of the bore, that is, an axis about which the bore is rotationally symmetrical.

The second pin has an external screw thread. An internal screw thread correlating to the external screw thread of the second pin is located in a second region of the through-hole. The external screw thread of the second pin can be screwed to the internal screw thread of the second region of the through-hole. This indicates that the second pin can be screwed into the second part of the through-hole.

The first region of the through-hole and a region that the second pin sweeps over upon being screwed into the through-hole, overlap. This means that the displaceability of the first pin is limited the further the second pin is screwed into the through-hole. Upon screwing in the second pin, the first pin is at least partially displaced by the second pin and pushed out of the through-hole. In this way, the transmission part to be fastened is fastened.

The second pin has a through-hole, preferably designed as a bore. An internal screw thread of the first pin is aligned with the through-hole. This means that the through-hole and the internal screw thread are aligned along straight lines. The lines extend parallel to the central axes of the internal screw thread and the through-hole. Each line extends in several points through a shell surface of the through-hole and the internal screw thread.

If the through-hole is a bore, the alignment with the internal screw thread is equivalent to the following three conditions being met: 1. The through-hole and the internal screw thread are aligned coaxially to each other; 2. An outer diameter of the internal screw thread is at least as large as a diameter of the through-hole; and 3. The through-hole and the internal screw thread are arranged opposite each other.

In the case of a coaxial alignment of the through-hole and the internal screw thread, the central axes of the through-hole and the internal screw thread are identical. The through-hole and the internal screw thread are aligned opposite each other, if only an air gap extends between an opening of the through-hole and an opening of the internal screw thread end, or if the two openings abut each other.

The arrangement according to the disclosure makes it possible to pass a screw, such as a pin screw, through the through-hole and screw it into the internal screw thread. The pin then forms an abutment for the head of the screw, wherein the chin of the head abuts the edge of an opening of the through-hole. If the screw is now screwed into the internal screw thread, it is tensioned between the first pin and the second pin or between the internal screw thread and the edge of the opening. The first pin is thereby pulled into the through-hole. Due to the force applied by the screw to the first pin as a result of the tension, the first pin can still be moved even if it has jammed in the first part of the through-hole by means of plastic deformation.

In a preferred development, the first pin has a groove running longitudinally, that is to say along the identical central axes of the first pin, of the second pin, of the through-hole of the main body, of the internal screw thread of the first main body and of the through-hole of the second main body. A groove is an elongated recess in a surface. It is distinguished from other recesses of the surface by a cross-section that is unchanged along the course of the groove. The cross-section is thus invariant with respect to a sectional plane oriented orthogonally to a curve describing the course of the groove. In the present case, the specified curve is a straight line running parallel to the specified central axes.

According to the development, a part of the main body engages in the groove. This prevents the first pin from rotating if a screw is screwed into its internal screw thread. The elongated course of the groove allows a displacement of the first pin in the first region of the through-hole. The main body preferably has a screw, which forms the specified part of the main body, which thus engages in the groove.

Alternatively, the main body can comprise the groove, wherein a part of the first pin engages in the groove.

A method according to the disclosure serves to fasten a transmission part, such as a planetary carrier, using the fastener according to the disclosure or a preferred development. The method is carried out in the following steps: Inserting the first pin into the first part of the through-hole of the main body; Screwing the external screw thread of the main body into an internal screw thread of a structure of the transmission fixed to the housing, for example into the housing itself; and Tensioning the first pin against the transmission part by screwing the external screw thread of the second pin into the internal screw thread of the main body and tensioning the second pin against the first pin.

By tensioning the second pin against the first pin, the first pin is pushed out of the through-hole of the main body and tensioned against the transmission part. If plastic deformation occurs, such that the first pin is jammed, the fastening of the transmission part can be released using a further method. This method comprises the following steps: Positioning the second pin in such a way that the first pin and the second pin are spaced apart from each other; Passing a screw through the through-hole of the second pin; and Screwing the screw into the internal screw thread of the first pin.

The second pin is positioned by rotating the second pin with its external screw thread in the internal screw thread of the main body. As a result, the distance between the second pin and the first pin can be varied. The screw is tensioned by screwing into the internal screw thread of the first pin, as described above, such that the jamming of the first pin is released and the first pin is pulled back into the through-hole of the main body.

The fastener 101 shown in FIG. 1 comprises a main body 103 with an external screw thread 105. The external screw thread 105 serves to screw the fastener 101 into a corresponding internal screw thread of a transmission housing. The internal screw thread of the transmission housing is designed as a through-hole, such that the fastener 101 can be used from the outside. A locknut 107 on the external screw thread 105 serves to secure the main body 103 against rotation.

The main body 103 is provided with a through-hole 109. If the main body 103 is screwed into the transmission housing, a first opening 111 of the through-hole 109 is located outside the housing and a second opening 113 is located inside.

A first pin 117 is arranged In a first region 115 of the through-hole 109. The first pin 117 is displaceable along a central axis of the through-hole 109.

A second region 119 of the through-hole 109 has an internal screw thread. A second pin 121 having a corresponding external screw thread is screwed into the internal screw thread.

The first opening 111 of the through-hole 109 is simultaneously the opening of the internal screw thread of the second region 119. The second pin 121 is inserted into the internal screw thread through the first opening 111 and screwed. As a result, it moves in the direction of the second opening 113 and finally penetrates into the first region 115 of the through-hole 109. Accordingly, the first pin 117 is displaced by the second pin 121 and pressed out of the second opening 113 into the interior of the transmission. By tensioning the first pin 117 by screwing in the second pin 121 against a transmission part, the transmission part is fastened.

The second pin 121 has a longitudinally extending through-hole 123. This is aligned with an internal screw thread 125 of the first pin 117. As a result, a pin screw 127 can be passed through the through-hole 123 of the second pin 121 and screwed into the internal screw thread 125. With the screw 127, any jamming of the first pin 117 can be released and the first pin 117 can be pulled back into its initial position.

A screw 129, which is screwed into the main body 103 and engages in a groove 131 of the first pin 117, thereby prevents the first pin 117 from rotating.

Figure 2:
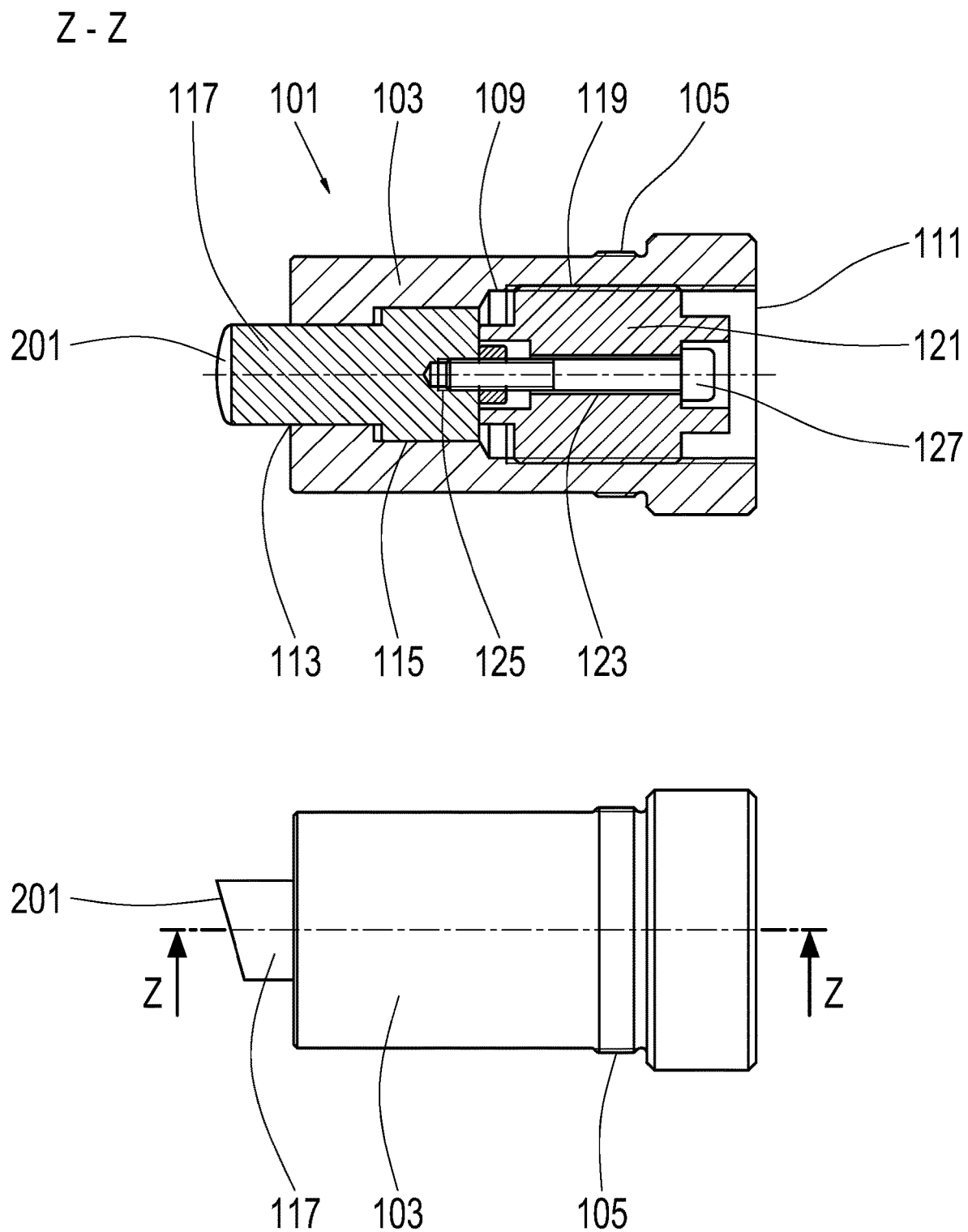
FIG. 2 shows a second variant of a fastener.

With the fastener 101 shown in FIG. 1, a central axis of the first pin 117 and of the second pin 121 and a central axis of the external screw thread 105 of the main body 103 extend in a manner anti-parallel to each other. A variant with a parallel course of the central axes is shown in FIG. 2. The first pin 117 here also has a beveled end face 201. This serves on the one hand to better fasten a transmission part to be fastened, but on the other hand also increases the risk of jamming the first pin 117.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Fastener
103 Main body
105 External screw thread
107 Locknut
109 Through-hole
111 First opening
113 Second opening
115 First region
117 First pin
119 Second region
121 Second pin
123 Through-hole
125 Internal screw thread
127 Pin screw
129 Screw
131 Groove
201 End face

The invention claimed is:

1. A fastener for a transmission part, the fastener comprising:
   a main body, wherein the main body has at least one external screw thread and at least one through-hole;
   a first pin displaceable in a first region of the through-hole; and
   a second pin having an external screw thread;
   wherein a second region of the through-hole has at least one internal screw thread configured to be screwed to the external screw thread of the second pin,
   wherein the second pin has a through-hole, and
   wherein the first pin has an internal screw thread aligned with the through-hole of the second pin.

2. The fastener according to claim 1, wherein the first pin has at least one groove extending longitudinally, and wherein a part of the main body engages in the groove.

3. A method for fastening a transmission part using a fastener, wherein the fastener comprises:
   a main body, wherein the main body has at least one external screw thread and at least one through-hole;
   a first pin displaceable in a first region of the through-hole; and
   a second pin having an external screw thread;
   wherein a second region of the through-hole has at least one internal screw thread configured to be screwed to the external screw thread of the second pin,
   wherein the second pin has a through-hole, and
   wherein the first pin has an internal screw thread aligned with the through-hole of the second pin, the method comprising:
   inserting the first pin into the first region of the through-hole of the main body;
   screwing the external screw thread of the main body into an internal screw thread of a structure of a transmission fixed to a housing; and
   tensioning the first pin against the transmission part by screwing the external screw thread of the second pin into the internal screw thread of the main body and tensioning the second pin against the first pin.

4. The method according to claim 3, further comprising:
   positioning the second pin such that the first pin and the second pin are spaced apart from each other;
   passing a screw through the through-hole of the second pin, and
   screwing into the internal screw thread of the first pin.

* * * * *